United States Patent [19]

Saito et al.

[11] Patent Number: 4,751,531

[45] Date of Patent: Jun. 14, 1988

[54] THERMAL-ELECTROSTATIC INK JET RECORDING APPARATUS

[75] Inventors: Koichi Saito; Yoshihiko Fujimura; Nanao Inoue, all of Kanagawa, Japan

[73] Assignee: Fuji Xerox Co., Ltd., Tokyo, Japan

[21] Appl. No.: 30,165

[22] Filed: Mar. 26, 1987

[30] Foreign Application Priority Data

Mar. 27, 1986 [JP] Japan .................................. 61-67303
Mar. 27, 1986 [JP] Japan .................................. 61-67309

[51] Int. Cl.⁴ ............................................. G01D 15/16
[52] U.S. Cl. ................................ 346/140 R; 346/1.1; 346/75; 400/126
[58] Field of Search ...................... 346/1.1, 75, 140 R, 346/140 PD, 153.1, 155, 159; 400/126

[56] References Cited

U.S. PATENT DOCUMENTS 3,790,703 2/1974 Carley .................................. 346/1.1
4,383,265 5/1983 Kohashi ...................... 346/140 PD

FOREIGN PATENT DOCUMENTS 0090775 5/1985 Japan ........................... 346/140 PD
0116451 6/1985 Japan ........................... 346/140 PD

*Primary Examiner*—Joseph W. Hartary
*Assistant Examiner*—Huan H. Tran
*Attorney, Agent, or Firm*—Finnegan, Henderson, Farabow, Garrett and Dunner

[57] ABSTRACT

An image recording head wherein both electric and thermal energies are applied to a liquid coloring agent arranged therein to jet out a liquid coloring agent, such as inks, located in the area to which both energies have been applied, the image recording head comprising a container for containing the ink which comprises a pair of opposite walls with a discharge portion provided at one of the edges of the wall for discharging the ink therefrom; electric energy applying means for applying an electric field to the liquid coloring agent in the container means; a plurality of heating elements installed on the inner face of one of the walls for heating the ink in the container; and an electric field forming electrode installed on the inner face of the other wall member.

6 Claims, 6 Drawing Sheets

THERMAL-ELECTROSTATIC INK JET RECORDING APPARATUS

FIELD OF THE INVENTION

This invention relates to a non-impact image recording head for recording an image on a recording member by jetting a liquid coloring agent, such as ink, at the recording member.

BACKGROUND OF THE INVENTION

Non-impact recording by the ink jet method is becoming popular for converting image data in the form of electrical signals into hard copies because less noise is produced during recording than in the impact recording. The ink jet method is also considered particularly useful because ordinary paper can be used without need for a special process, such as fixing, for recording purposes.

The ink jet method that is already in use comprises the steps of filling an airtight container with ink, applying a pressure pulse thereto, and sending the ink out of an orifice of the container in a jet for recording purposes. The ink jet means in the aforesaid method cannot be made compact in view of its operating mechanism, and the ink jet recorder must be scanned mechanically if recording is to be made with a desired image density. This latter requirement greatly reduces recording speed. At the same time, there have been proposed techniques for remedying shortcomings inherent in the ink jet method and making high-speed recording possible.

The magnetic ink jet method is a typical example of such improvement, which comprises arranging magnetic ink close to a magnetic electrode array, forming an ink-jet state corresponding in position to a picture element by making use of a swell of the ink in the presence of a magnetic field, and jetting the magnetic ink in the static electric field. Since this method admits of electronic scanning, high-speed recording becomes possible, but it is still disadvantageous in that not only the selection of ink but also the coloration characteristic of the ink is limited.

Apart from the aforesaid method, there is also well known the so-called plane ink jet method, which comprises arranging ink in a slitlike inkholder in parallel to an electrode array, and jetting the ink in accordance with an electric field pattern formed between an electrode facing the electrode array through recording paper. Since no minute orifice for storing ink is required in this method, ink clogging can be prevented. However, high voltage applied for jetting the ink makes it necessary to drive the electrode array on a time division basis to prevent a voltage leak across the adjoining or neighboring electrodes and prevent the recording speed from being increased to the extent intended.

There has also been proposed the so-called heat bubble jet method for jetting ink out of an orifice by means of thermal energy. In this method, the ink is abruptly heated to cause film boiling and a pressure rise resulting from the rapid formation of bubbles within the orifice is utilized to jet the ink out thereof. However, the film boiling temperatures are as high as 500°–600° C. and this makes it difficult to put the aforesaid method to practical use because the ink properties tend to change with temperature and because the heating resistor protective layer provided as a heating means is deteriorated at the high temperatures employed in this method.

As set forth above, there are remaining problems to be practically solved in the ink jet methods heretofore developed, the problems including difficulty in sufficiently increasing recording speed, necessity of employing special ink and contriving a particular driving means, and thermal deterioration that the ink and the heating means are expected to undergo.

OBJECT AND SUMMARY OF THE INVENTION

The present invention is intended to solve the aforesaid problems and it is an object of the invention to provide an image recording head allowing the facile selection of ink and high-speed recording.

According to the present invention there is provided an image recording head wherein both electric and thermal energies are applied to a liquid coloring agent arranged therein to jet the liquid coloring agent located in the area to which both the energies have been applied, comprising container means for containing the liquid coloring agent, the container means further comprising a pair of spaced apart, opposing wall members with a discharge portion for discharging the liquid coloring agent therefrom, the discharge portion being provided at one of the edges of the wall members; thermal energy applying means for heating the liquid coloring agent in the container means, the thermal energy applying means comprising a plurality of heating elements arranged on the inner face of one of the wall members; and electric energy applying means for applying an electric field to the liquid coloring agent in the container means, the electric energy applying means comprising an electric field forming electrode installed on the inner face of the other of said wall members.

The front end of the electric field forming electrode on the discharge portion side preferably is divided like the teeth of a comb. Further, the edge of the electric field forming electrode on the inner face of the opposite wall member on the discharge portion side is located away from the edge of the discharge portion.

The plurality of heating elements preferably is arranged in an array with the elements being parallel to the discharge portion at the wall members at a predetermined pitch and so selected as to satisfy $D<4$ P, wherein D is the gap between the wall members and P is the pitch of said heating element arrangment.

The method of operating the image recording head according to the present invention comprises applying the electric and thermal energies to the liquid coloring agent and jetting the agent located in the area to which both the energies have been applied.

The aforesaid method is implemented as follows:

An electric field is uniformly applied to the whole liquid coloring agent first. In this state, the agent is not yet stimulated to be jetted. Then the thermal energy is locally applied to the agent, whereby the agent located in the area receiving the thermal energy is caused to be jetted at the recording member. While the liquid coloring agent is heated to the extent that it is not yet stimulated to the point of jetting the same phenomenon occurs when the electric field is locally applied.

A plurality of heating elements, for instance, are arranged in the form of an array and allowed to contact a liquid coloring agent. The heating element located in a position corresponding to a recording picture element is selectively heated in response to an image signal and a uniform electric field is applied to the whole liquid coloring agent. Thus, the liquid coloring agent is caused to jet at a recording member. One picture element is recorded for each jetting of the agent. By the repetition of the aforesaid process, a picture element train in the form of a line is recorded and, by scanning the recording member, an image can be recorded.

Two wall members are employed to contain a liquid coloring agent in the image recording head according to the present invention. In other words, ink is contained in the space formed between the pair of wall members. The edges of the wall members are used to form the ink discharge portion and the plurality of heating elements are installed on the inner face of one wall member. When the heating members are heated, the liquid coloring agent in the neighborhood of each element is caused to fly at the recording member. In the recording head thus arranged, the quantity of the liquid coloring agent jetted is properly determined by adjusting the gap between the wall members.

The electric field with proper intensity is applicable to the liquid coloring agent using the electric field forming electrode installed on the inner face of the other wall member. Furthermore, the ink in each nonheated area is restrained from jetting by dividing the front end of the discharge portion of the electric field forming electrode in the form of a comb, whereby the control of ink jetting from each heating area can speedily be carried out to provide high-speed reliable recording.

DETAILED DESCRIPTION OF THE INVENTION

Figure 2A:
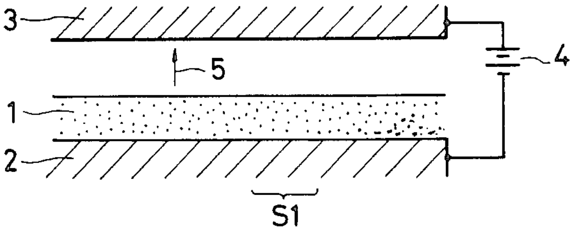
FIGS. 2(A) to 2(C) are schematic views illustrating the recordin g principle according to the present invention.

As shown in FIG. 2(A), a liquid coloring agent 1 is arranged in between a base electrode 2 and an opposite electrode 3. The liquid coloring agent 1 is preferably ink (hereinafter referred to as simply the "ink 1") having proper electrical resistance and being in a liquid state at operating temperature. The base electrode 2 and the opposite electrode 3 are both conductive plates.

A d.c. power supply 4 is used to apply voltage across both the electrodes 2, 3. At this time, a fixed static electric field is added to the ink 1 and, because of its static inductive action, the Coulomb force given by the sum of the inductive charge produced thereby and the static electric field acts on the free surface of the ink. Therefore, the ink 1 attempts to jet in a direction 5 due to that force.

On the other hand, the surface tension, interfacial tension and viscosity resistance of the ink act as a drag against jetting. FIG. 2(A) shows the state in which the drag is greater than the Coulomb force and the ink level remains flat.

Figure 2B:
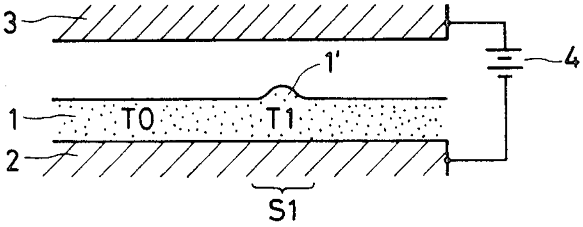
Figure 2C:
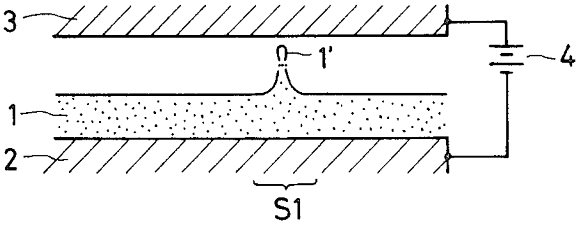

The ink 1 is then locally heated; that is, the temperature of an area S1 in FIG. 2(B) raised to T1 which is higher than the temperature TO in the remaining area. As shown in FIG. 2(B), consequently, the ink level in the area S1 is caused to swell, i.e., a reduction in the drag in the area S1 occurs because the ink temperature rise allows the action of the Coulomb force to increase locally. The electric field is concentrated in the ink 1' thus swollen and the action of the Coulomb force is further accelerated. Ultimately, part of the ink 1' in the area S1 grows in the form of a column as shown in FIG. 2(C) and a droplet is jetted to the opposite electrode 3. This phenomenon can be brought about rapidly without sharply heating the ink as the surface thereof undergoes a phase change resulting from film boiling.

In other words, thermal as well as electric energies are applied by the electric field and heating to the ink and the quantities of both the energies thus applied are so selected as to allow the ink to jet only from an area to which both the energies have been applied. In this manner, the place at which the ink is caused to jet and the timing thereof is controllable.

The aforesaid principle was proved through the following experiments.

The ink 1 was arranged on the base electrode 2 as shown in FIG. 2(A) and, while the temperature thereof was kept constant, the voltage of the power supply 4 was gradually raised. When the voltage exceeded a certain level, an ink column 1' shown in FIG. 2(C) began to grow randomly toward the opposite electrode 3. This phenomenon is explained as the growth of an unstable electrical fluid mechanical wave in "FIELD COUPLED SURFACE WAVE"; pp. 61-66, J. R. Melcher (M. I. T. Press).

The Coulomb force is locally concentrated by the perturbation (local unevenness in the deformation of the liquid level or electric field) naturally produced when the Coulomb force acting in the upward direction perpendicular to the ink liquid level maintains equilibrium against the drag acting in the downward direction. Then the Coulomb force overcomes the drag to allow the ink column to grow.

In the present invention, the electric field was selected so as to be insufficient to let an ink column grow randomly when applied to ink at room temperature. When the ink was heated in the aforesaid state, the surface tension and viscosity of the ink located in the heated area was reduced. As a result, an unstable surface wave was produced in an electric field of the same strength.

The ink thus caused to be jetted was led to the surface of a recording member, such as recording paper, so that one dot could be recorded. Moreover, an image could be recorded by arranging the dots methodically in a prescribed pattern.

Figure 1:
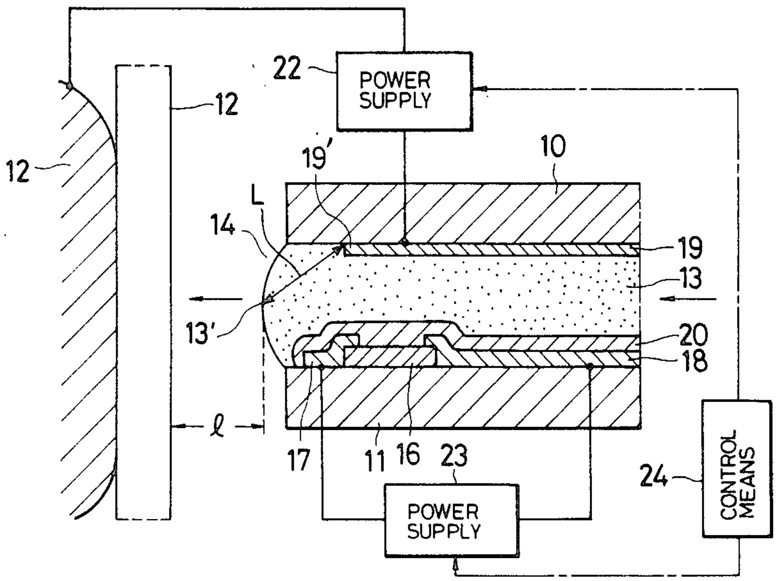
FIG. 1 is a vertical sectional views of an image recording head embodiment the present invention.

FIG. 1 is a transverse sectional view of an image recording head and its peripheral portion embodying the present invention.

As shown in FIG. 1, a pair of wall members 10, 11 are arranged so that one edge of each faces a recording member 12. The recording member 12 is a sheet of ordinary recording paper for use in a conventional copying machine.

The pair of wall members 10, 11 are arranged a fixed space apart and a liquid coloring agent 13 is contained in therebetween. The edges of the wall members 10, 11 set opposite to the recording member 12 form a slit having a width in the direction parallel to the paper surface. The slit portion is called a discharge opening 14. The liquid coloring agent 13 forms a convex face 13' at the discharge opening because of its surface tension.

A number of heating resistors 16 are installed on the inner face of one wall member 11, the heating resistors being arranged in an array perpendicularly to the paper surface. An electrode 17 common to the heating resistors 16 is connected to one end of each of them, whereas lead electrodes 18 are individually connected to the other end of each of the resistors. A heat-resistant insulating layer 20 is arranged to cover the heating resistors 16 and the electrodes 17 and 18. Moreover, roughly the entire inner face of the other wall member 10 is covered with an electric-field forming electrode 19.

The heat resistant insulating layer 20 is formed on the surface of each heating resistor 16. The heat resistant insulating layer provided on the thermal energy applying means prevents the thermal energy applying means from contacting the liquid coloring agent at high temperatures and thus suffer corrosion.

The lead electrodes for supplying current are connected to the plurality of heating resistors constituting the thermal energy applying means, whereas the heat resistant layer also functions as a means for increasing the insulation between the electrodes.

Figure 3:
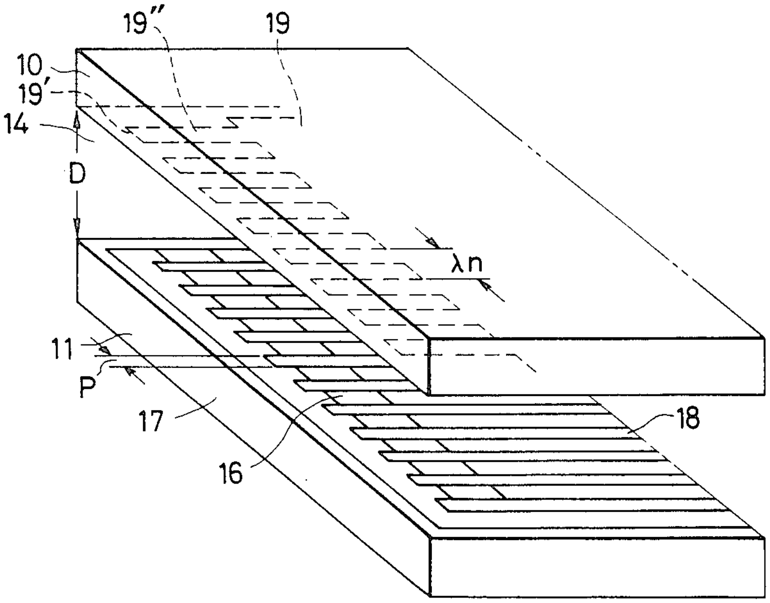
FIG. 3 is a perspective view of a principal portion of the head of FIG. 1.

FIG. 3 is a perspective view of a principal portion of the recording head. The heating resistors 16 set in the array may be constructed in the same manner as that in the case of a thermal recording head. The so-called edge type thermal head is employed in this example to provide a recording with a density of 8 dots/millimeter (mm) on thermal recording paper having a color development temperature of about 90° C. When a recording is made on the thermal recording paper, 0.5 Watts per dot (W/dot) of power is supplied to each heating resistor for 1 msec. The space D selected between the pair of wall members 10, 11 was set at 100 micrometers (μm).

As shown in FIG. 1 again, the gap l between the discharge opening 14 and the recording member 12 was set at 200 μm; and the gap between the discharge opening 14 and the end of the heating resistors was also set at 200 μm. Further, a backing or opposite electrode 21 was installed on the rear face of the recording member 12 and a power supply 22 was connected to the electrodes 19 and 21 to apply a fixed voltage thereacross. The electric-field forming electrode 19 was grounded and +1,500 volts (V) was applied to the opposite electrode 21, to embody the electric energy applying means.

A power supply 23 was also connected to the electrodes 17, 18 on both ends of the heating resistors 16, to embody the thermal energy applying means. A control means 24 was connected to the power supplies 22, 23 so that the energy was switched on/off depending on the image signal of an image being recorded. The control means 24 was formed with a circuit constituted by a shift register driver for driving the known thermal head and the like.

As the liquid coloring agent 13 in this example, ink containing about 15% by weight of carbon-black pigment dispersed in liquid paraffin, with volume resistivity at 20° C. being $1.0\times10^6$ ohms per centimeter (Ω.cm), viscosity at 300 centipoise (cp), and surface tension at 70 dynes per centimeter (dyne/cm) was used.

When the voltage derived from the power source 22 was applied across the electric field forming electrode 19 and the opposite electrode 21 in the recording head thus constructed, the liquid coloring agent located close to the discharge opening 14 was subjected to a uniform electric field.

Current, e.g., 25 V, 25 milliamperes (mA), was selectively supplied to the heating resistors 16 for 1 millisecond (msec) in the aforesaid state.

Only the ink 13 located close to the heating resistor 16 supplied with the current was caused to fly at the recording member 12 and a circular dot about 150 μm in diameter was recorded on the recording surface. Recording was possible even when the length of time required for supplying power was shortened up to 200 microseconds (μsec).

When the above operation was conducted while no voltage was applied across the electric field forming electrode 19 and the backing or opposite electrode 21, no ink was caused to jet.

When the voltage being applied across the electric-field forming electrode 19 and the opposite electrode 21 was raised without supplying the current to the heating resistor 16, the ink 13 in the discharge opening 14 began to jet randomly at a voltage level exceeding 3,000 V.

As stated above, the ink is caused to jet by jointly applying the electric and thermal energies to the liquid coloring agent. Moreover, there exist clearly defined conditions under which the ink will jet and a marginal values (threshold values) at which control can be effected to ensure stable ink jetting.

FIGS. 4(A)–(D) are graphs showing the results of experiments intended to find the threshold values.

Figure 4A:
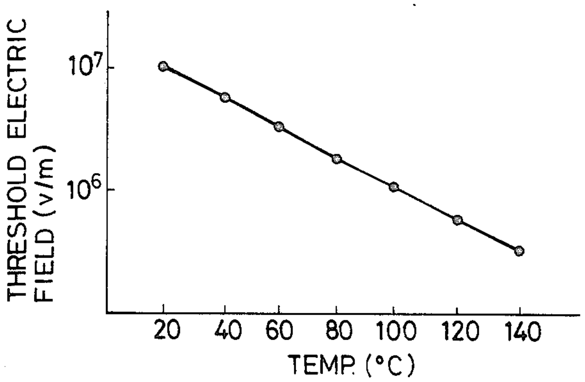
FIGS. 4(A) to 4(D) are graphs showing the dependance of the electric field threshold value on temperature and other ink properties.
Figure 4B:
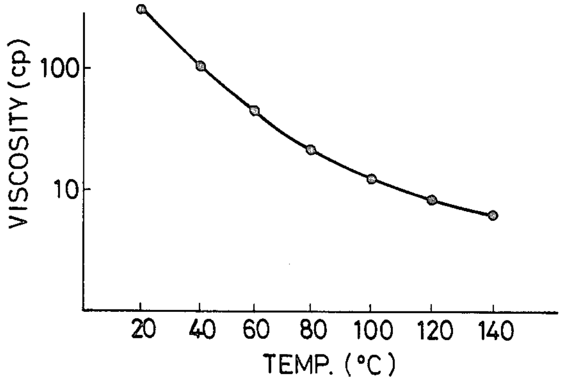
Figure 4C:
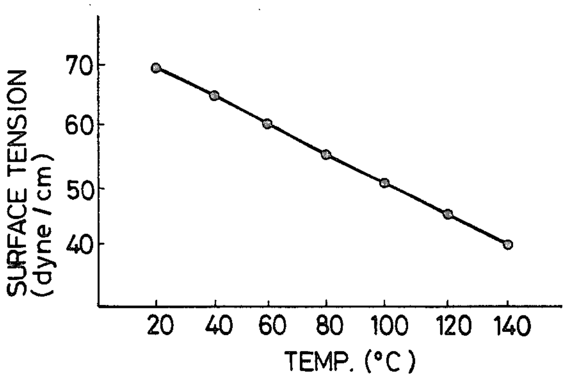
Figure 4D:
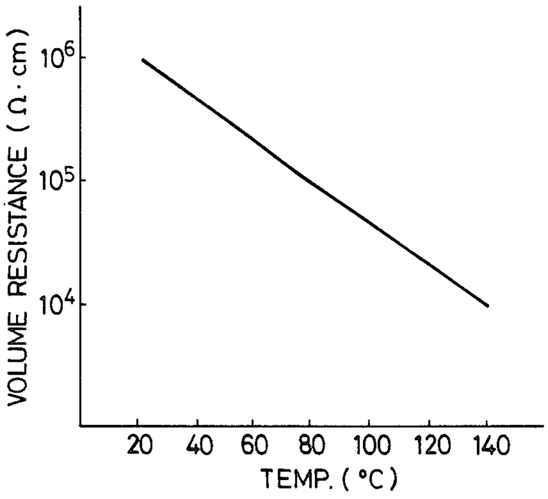

According to the data shown in FIG. 4(A), the higher the ink temperature, the lower the threshold electric field value becomes. As shown in FIG. 4(B), the viscosity of the ink is expressed by a curve and decreases as the ink temperature rises. The same trend is observed in the cases of the surface tension (FIG. 4(C)) and specific volume resistance (FIG. 4(D)). In other words, the threshold electric field value decreases as the temperature rises, depending on the composite effect resulting from changes in physical properties including the viscosity, surface tension, and electrical conductivity of the ink.

Accordingly, in an electric field having a level at which the ink is not stimulated to jet when at the room temperature, the ink will jet when it is locally heated because of the cooperative action of the heat and static electrical field. In this manner, picture element recording may be carried out.

Moreover, as shown in FIG. 1, the discharge portion 14 of the recording head thus constructed can be brought sufficiently close to the recording member and the quantity of ink to be jetted can be selected by adjusting the gap between the wall members 10, 11.

The front end 19' (FIG. 1) of the electric-field forming electrode 19 should preferably be located back from the edge of the wall member 10 so as to apply to the ink 13 an electric field that is as uniform as possible in the proximity of the discharge portion 14. In case the front end 19' of the electric field forming electrode 19 is projected closer to the recording member 12 than the ink, a discharge may occur across the opposite electrode 21 and the electric-field forming electrode 19. Moreover, the edge 19' of the electric-field forming electrode 19 is preferably set parallel to the edge of the discharge portion 14, i.e., the gap there between is made constant thereby, to form a uniform electric field.

In that case, the distance L (shown in FIG. 1) between the front end position of the free surface 13' of the ink and the end 19' of the electric-field forming electrode 19 differs with the conductivity of the ink for use but it should preferably be about 10–500 μm. When electrically conductive ink is used, ink jetting remains unaffected even when the distance is L increased. When resistive ink (a volume resistivity of over $10^6$Ω.cm) is used, the distance L should not be over 500 μm.

The voltage application time for the formation of the electric field must be lengthened if recording is made by applying pulsatile voltage for forming the electric field and simultaneously applying pulsatile current to the heating resistors 16. For the above reasons, the electric-field forming electrode should preferably be formed in the aforesaid manner.

A voltage pulse at 2,000 V was actually applied for 1 msec across the opposite electrode 21 and the electric-field forming electrode 19 of the image recording head of FIG. 1, whereas power at 20 V was simultaneously supplied for 1 msec (the resistance was 300Ω) to the heating resistor 16. A circular dot of 150 μm was subsequently recorded in as the case of the preceeding embodiment. At that time, the ink 13 used was prepared by dispersing 15% by weight of carbon black pigment in liquid paraffin and it had the following properties: volume resistivity at 20° C.=1.0×.$10^8$Ω.cm; viscosity=300 cp; and surface tension=30 dyne/cm.

For the purpose of comparison, an electric-field forming electrode 19 reaching the edge of the discharge portion 14 was formed on the inner face of a wall member 10 and operated in the manner described above. No droplet of ink was caused to jet although an electrical discharge was induced across the opposite electrode 21 and the electric-field forming electrode 19.

The electrode 19 may be segmented, or divided into fingers, like the teeth of a comb, as shown in FIG. 3, which has a plurality of comb-like electrode portions 19" and a connecting electrode portion for connecting the comblike electrode portions. As before, the front end 19' of each electrode segment 19" is preferably spaced back from the edge of wall member 10.

Using the embodiment shown in FIG. 3, 3 kinds of densities of the heating resistors 16 arranged on the wall member 11 such that the pitch P of the resistors was 4 dots/mm (250 μm), 8 dots/mm (125 μm), 12 dots/mm (83 μm), and a chrome (Cr) layer was deposited by evaporation on a glass base to form the electrode forming electrode 19 on the other member 11.

The ink used was prepared by dispersing 15% by weight of carbon particles in liquid paraffin and it had the following properties at 20° C.: volume resistivity=1×$10^8$Ω.cm; viscosity=200 cp; and surface tension=30 dyne/cm.

Power at 1 watt/dot was supplied to each heating resistor 16 and the discharge portion 14 was spaced apart 300 μm from the opposite electrode 21. Voltage at 2000 V was applied for 1 msec across the opposite electrode 21 and the electric field-forming electrode 19. Table 1 shows the results obtained.

TABLE 1

| D/P | 1/2 | 1 | 2/1 | 4 | 6 |
|---|---|---|---|---|---|
| P | | | | | |
| 4 dots/mm | ○ | ○ | ** | ** | ** |
| 8 | ○ | ○ | ○ | ** | ** |
| 12 | * | ○ | ○ | ○ | ** |

Heating resistor arranging pitch: P
Gap between the wall members: D

In the portion marked with *, the ink 13 overflowed near the heating resistor 16 and stuck to the recording member. In the portion marked with , the ink 13 near one heating resistor 16 which was heated was jetted in the direction perpendicular to the long direction of the discharge portion 14 and caused more than one dot to be recorded on the recording member 12. In the portion marked with ○, the ink 13 jetted out satisfactorily as one dot. In other words, the ink did not jet out as one dot when the gap D between the wall members exceeded 4 times the pitch P at which the heating resistors 16** were arranged.

The above phenomenon is considered attributable to the fact that, because the ink is incompressible, the surface wave, which has a wavelength determined by the balance between the electrostatic field and the surface tension, makes the ink to split into several droplets in company with the surface waveform.

Moreover, if the gap D between the wall members is to narrow, the ink expands as the heating resistor 16 heats and overflows out of the discharge portion because of the thermal expansion force. As is obvious from the above, it is preferred to set D/P at greater than ½ and, more preferably, at greater than 1 but less than 4.

Figure 5:
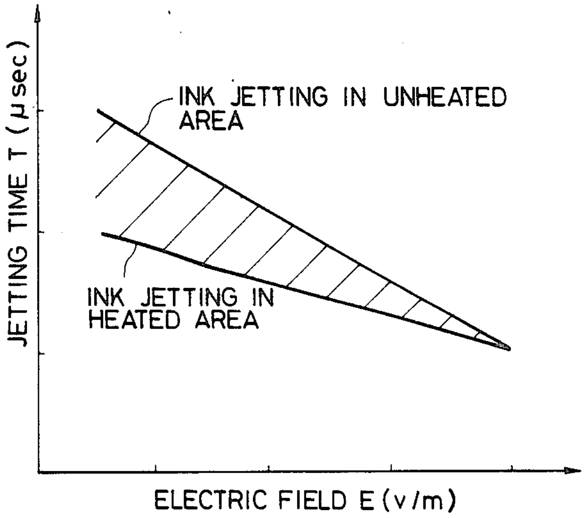
FIG. 5 is a graph showing the jetting characteristics of ink.

The relation of the flying characteristics of the ink to the intensity of the electric field is shown in FIG. 5. As shown in the graph, the time T required for jetting and converting the ink into a picture element is proportionally shortened as the intensity E of a uniformly-applied electric field increases. At this time, the difference between the time required to cause the ink in the heated area to be jetted and the time required to cause unheated ink to jet tends to become less as the intensity E of the electric field increases.

In other words, the jetting time T is shortened as the intensity of the electric field is increased. Consequently, high-speed recording becomes possible on one hand but erroneous jetting occurs on the other. If the heating resistor is energized for an insufficient time, the ink temperature is insufficiently raised causing the dot to be too small or the ink to split into several droplets.

In order to ensure that the ink is controllably jetted but high-speed recording is maintained, it is necessary to select the heating time required to raise the ink temperature, properly at the intensity of the electric field to be applied, and prevent the ink in the unheated area from jetting out. According to the experiments, at selected field intensities, the ink in the unheated area was seen to jet with a dot train at a regular pitch. The dot train pitch was shortened as the intensity of the electric field was increased but was still larger than the pitch of droplets from ink heated by a heating element.

Detailed studies of the jetting phenomenon of the equally spaced dot train in the unheated area made several conclusions possible. First, although the ink is subjected to Coulomb force in the electric field, a wave is generated on its surface because it is incompressible. Its wavelength is determined by the ink pressure, surface tension, viscosity resistance, gravity, etc. The generation of such a wavelength is related to an electric fluid mechanical surface wave.

There are solutions of various wavelengths resulting from equations reduced from the balance of forces including electrostatic force, pressure, gravity, surface tension, viscosity resistance, etc. but the growth rates, n[$sec^{-1}$], of waves in the direction of the applied electrostatic force respectively have different values depending on the wavelength. In consequence, the growth of a wave surface corresponding to a wavelength λ maximizing n occurs with first priority and, with the wavelength λ, the equally spaced dot train pitch is determined.

Figure 6:
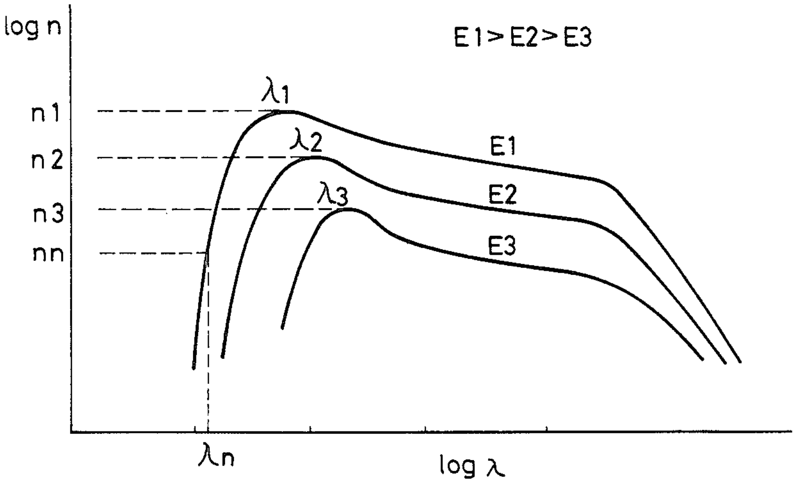
FIG. 6 is a graph illustraing the growth of the surface wave generated in an ink discharge portion of the head of FIG. 1.
Figure 7:
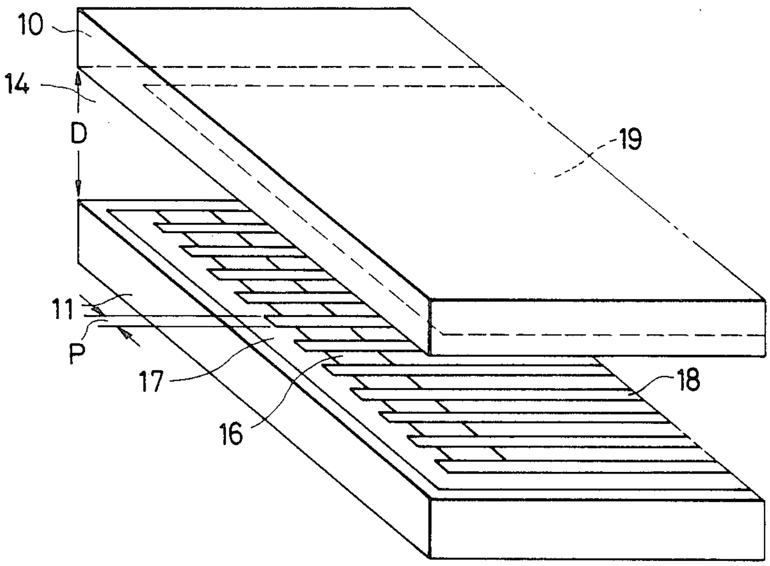
FIG. 7 is a perspective view of an image recording head according to the present invention.

FIG. 6 shows typical solutions obtained from the calculation of the theoretic relationship between n and λ with the intensity E of the electric field applied. The wavelengths λ1, λ2, λ3 for maximizing n with the intensity E1, E2, E3 of each electric field as a parameter were seen to roughly conform to the dot pitch within experimental accuracy.

As shown in FIG. 3 according to the present invention, the comblike portion 19" are preferably formed on the inner face of the wall member 10 in order to restrain the generation of a surface wave that would cause erroneous jetting.

When the discharge portion 14 is provided with predetermined modulation by thus dividing the electric field forming electrode 19 into segments, like the teeth of a comb, the wavelength of the electric liquid mechanical surface wave can be synchronized with the modulation wavelength λn.

In other words, an allowable intensity of the electric field without causing ink to jet in error when no modulation is provided is assumed to be E3 as shown in FIG. 6.

With increasing intensity of the electric field, a surface wave with the fastest wave nn and the wavelength λ3 grows but modulation is provided for the discharge portion at this time so that the surface wave is made to synchronize with that of wavelength λn.

In order to increase the head speed, the intensity of the electric field is increased up to E1, whereby the surface wave of wavelength λ1 is generated when no modulation is provided; but, when modulation is provided, it attempts to synchronize with λn. Accordingly, the surface wave is restricted to a slow wave corresponding not to n1 but nn in terms of the growth rate in the low temperature zone and the ink in the unheated area is restrained from jetting out. The ink in the unheated area is thus restrained from jetting out even though the electric field application and heating time is prolonged to some extent, with the application of a greater electric field.

The wall members 10, 11 are prepared from, e.g., glass, epoxy resin or Bakelite. The front end of the electric field forming electrode 19 is preferably methodically divided like the teeth of a comb and subjected to modulation.

The modulation pitch is, as illustrated in FIG. 6, set at least lower than the wavelength λ(Max) giving the fastest wave corresponding to the electric field E during operation. This λ(Max) is determined by the ink viscosity, surface tension and the like. However, in the case of ink having (viscosity=10–500 cp, surface tension=20–40 dyne/cm, and volume resistivity of $10^6$Ω.cm to facilitate electrostatic induction, 50 m–1 μm should be set with the intensity of the electric field $10^6$–$10^7$ V/m. Accordingly, modulation wavelength λ(n) should be within the range of 10 m–200 μm.

In the case of the embodiment of FIG. 3, for instance, dye-soluble oil ink having the following properties at 20° C. and the following arrangement was used: volume resistivity=$10^7$Ω.cm; viscosity=30 cp; surface tension=37 dyne/cm; head recording density=8 dots/mm; gap D between the wall members=100 μm; gap between the recording member and the discharge portion=30 μm; energization of the heating resistor=20 V for 1 msec; and modulation wavelength λ=125 μm.

In the aforesaid case, the ink in the unheated area was prevented from jetting out with the electric field applied at 2,000 V for 5 msec and also 3,000 V for 1 msec. When λn was made equal to the pitch at which the heating resistors were arranged as shown in FIG. 6, the positional accuracy of a dot recorded by the ink droplets was improved.

For comparison, a head without the aforesaid modulation was operated likewise for recording. The ink in the heated area started jetting at 2,000 V for 1 msec but stable dot recording was available for the first time within the range of roughly 2,000 V for 5 msec–3,000 V for 1 msec. However, the ink in the unheated area was seen to jet out in this case.

As set forth above, the modulation is provided for the ink discharge portion to restrain erroneous ink jetting to stabilize dot recording and also to realize high-speed recording.

The construction of the ink discharge portion is not limited to the aforesaid embodiment and similar effect may be achieved by processing the electric field in various ways. Moreover, the contours and arrangement of heating resistors installed on the inner face of the wall member may be modified. In this case, the construction similar to that used in a thermal head may be used. The electric-field forming electrode installed on the inner face of the wall member may be changed in terms of quality and contour. The image recording head according to the present invention as illustrated above is capable of jetting the ink for high-speed and high-density recording at temperatures not exceeding that which causes the extreme thermal deterioration of the ink, the heating resistors and the like with an electric field not so intense as to cause leakage across the electrodes.

The means for holding the ink is relatively simple in construction and needs no complicated precise mechanism. Furthermore, the comparatively small quantity of the electric and thermal energies enable the driving circuit to be made compact.

What is claimed is:

1. An image recording apparatus adapted to apply both electric and thermal energies to a liquid coloring agent to jet droplets of the liquid coloring agent toward a backing electrode adapted to support a recording medium comprising:

container means for containing said liquid coloring agent, said container means comprising a pair of spaced apart, opposing wall members, each having at least one edge, and a discharge portion at one of said edges of said wall members for discharging said liquid coloring agent from said container means;

thermal energy applying means for heating said liquid coloring agent in said container means, said thermal energy applying means comprising a plurality of heating elements arranged on the inner face of a first one of said wall members, said plurality of heating elements being arrayed in parallel to the discharge portion at one of said edges of said wall members at a predetermined pitch and so selected as to satisfy $D<4P$, wherein D is the gap between said wall members and P is the pitch of said heating elements;

electric energy applying means for applying an electric field to said liquid coloring agent in said container means, said electric energy applying means comprising an electric field forming electrode installed on the inner face of a second one of said wall members;

a first power supply means for establishing a voltage drop between the electric field forming electrode and the backing electrode to produce the electric field having a level less than the level required to jet liquid coloring agent toward the backing electrode; and second power supply means for selectively energizing said heating elements to raise the temperature of the liquid coloring agent in the area of said energized heating elements to jet droplets of said liquid coloring agent under the influence of said electric field.

2. An apparatus as claimed in claim 1, in which a heat resistant layer is provided on said thermal energy applying means.

3. An apparatus as claimed in claim 1, in which said first power supply means is adapted to supply a pulsed voltage between the electric field forming electrode and the backing electrode.

4. An apparatus as claimed in claim 3, in which said discharge portion is slit-shaped.

5. The image recording apparatus of claim 1, wherein said electric field forming electrode includes a front end facing the discharge portion side, said front end of said electrode being segmented.

6. The image recording apparatus of claims 1, or 5 wherein said electric field forming electrode on the inner face of said second one of said wall members is installed on said inner face away from said discharge portion.

* * * * *